United States Patent
Banghard et al.

(10) Patent No.: US 6,902,409 B2
(45) Date of Patent: Jun. 7, 2005

(54) DEVICE FOR EARTHING A SWITCHING DEVICE ARRANGED IN A MODULE FRAME IN A DISPLACEABLE MANNER

(75) Inventors: Johannes-Gerhard Banghard, Friedrichsthal (DE); Erhard Deylitz, Berlin (DE); Stefan Losch, Berlin (DE)

(73) Assignee: Siemens Aktiengesellschaft, Munich (DE)

(*) Notice: Subject to any disclaimer, the term of this patent is extended or adjusted under 35 U.S.C. 154(b) by 179 days.

(21) Appl. No.: 10/432,655
(22) PCT Filed: Aug. 3, 2001
(86) PCT No.: PCT/DE01/02984
§ 371 (c)(1), (2), (4) Date: May 23, 2003
(87) PCT Pub. No.: WO02/43209
PCT Pub. Date: May 30, 2002

(65) Prior Publication Data
US 2004/0027741 A1 Feb. 12, 2004

(30) Foreign Application Priority Data
Nov. 23, 2000 (DE) .................................. 200 20 401 U

(51) Int. Cl.$^7$ .............................................. H01R 12/00
(52) U.S. Cl. ........................................ 439/64; 439/251
(58) Field of Search .......................... 439/64, 377, 857, 439/521; 361/823

(56) References Cited
U.S. PATENT DOCUMENTS
4,026,622 A * 5/1977 Siciliano ..................... 439/857
4,845,589 A * 7/1989 Weidler et al. ............. 439/857
5,024,627 A * 6/1991 Bennett et al. ............. 439/631
5,030,108 A * 7/1991 Babow et al. ................ 439/64
5,086,372 A * 2/1992 Bennett et al. ............... 439/64
6,280,216 B1 * 8/2001 Bernier et al. ............. 439/251
6,452,785 B1 * 9/2002 Kaaden et al. ............. 439/715

FOREIGN PATENT DOCUMENTS
DE 1201460 9/1965
DE 7809545 5/1982
EP 0228987 7/1987

OTHER PUBLICATIONS
Technical catalog A.S505–D–01 from ABB SACE; © Apr. 1997.

* cited by examiner

Primary Examiner—Tho D. Ta
(74) Attorney, Agent, or Firm—Harness, Dickey & Pierce, P.L.C.

(57) ABSTRACT

A retrofittable earthling device includes a first contact arranged on the switching device and a second contact arranged on the module frame by way of a contact carrier. They are adjacently spring-mounted, during the movement of the switching device from its point of separation into its operating position. In order to relieve the contact carrier, in one such device, of electrodynamic effects and thus to make the same easy to assemble, the contact carrier includes a first partial region for connecting an earthing device, and a second partial region which can be connected to the second contact, in addition to a contact strip connecting the two partial regions. The first partial region can be connected to the module frame in a fixed manner and the second partial region is held on the rear wall of the module frame, with transversal play in relation to the direction of movement of the switching device.

22 Claims, 2 Drawing Sheets

DEVICE FOR EARTHING A SWITCHING DEVICE ARRANGED IN A MODULE FRAME IN A DISPLACEABLE MANNER

This application is the national phase under 35 U.S.C. § 371 of PCT International Application No. PCT/DE01/02984 which has an International filing date of Aug. 3, 2001, which designated the United States of America and which claims priority on German Patent Application number DE 200 20 401,7 filed Nov. 23, 2000 the entire contents of which are hereby incorporated herein by reference.

FIELD OF THE INVENTION the invention generally relates to the field of electrical switchgear assemblies. It may be applied to the design of a device for grounding a switching device which is arranged moveably between a disconnected position and an operating position in a withdrawable part rack or modular frame of a switchgear assembly. Such grounding devices can be provided in order to ground a switching device, which can be pushed into the withdrawable part rack or taken out of the withdrawable part rack. This should be done over the entire movement path from the disconnected position to the operating position, such that currents of the order of magnitude of 50 kA are reliably dissipated for up to 1 s by way of the attachable grounding device.

BACKGROUND OF THE INVENTION

In the case of a known grounding device provided for this purpose, a first contact, in the form of a contact blade, is arranged in a fixed manner on the switching device. A second opposing contact, provided with contact fingers, is arranged in a fixed manner on the withdrawable part rack. In this case, the contact surfaces of the two contacts extend in the movement direction of the switching device such that they rest against one another when the switching device is moved from the disconnected position to the operating position. In order for very high currents to be dissipated properly, it is essential that the contact surfaces of the second contact rest against both sides of the first contact with the same contact force. In order to ensure this, the known device also has a contact force spring overlapping the second contact. For a grounding means to be attached—for example in the form of a conductor cable—in the case of this known device, a connection is in practice formed on a self-supporting end of a rigid contact support which is screwed tightly to the second contact on the rear wall of the withdrawable part rack. In this case, the form of the screw connection is such that the second contact rests in a fixed manner against the outside of the rear wall of the withdrawable part rack via first bearing surfaces and the opposite piece associated with the screw rests in a fixed manner against the inside of the rear wall via second bearing surfaces (technical catalog A.S505-D-01 from ABB SACE, April 1997). When a very high current which is to be dissipated, considerable electrodynamic forces from the grounding device act on that self-supporting end of the contact support which is provided with the connection. These forces may bend the contact support, and, in the process, the screw connection between the contact support and the second contact may be damaged or loosened.

SUMMARY OF THE INVENTION

An embodiment of the invention is based on an object of providing a device for the known grounding purpose in which the contact support is relieved of the effects of electrodynamic forces and is configured such that it is easy to install.

In order to achieve an object, a refinement of the known grounding device provides that the contact support has a first subregion, provided for connecting a grounding device, and a second subregion, which may be connected to the second contact, as well as a contact strip connecting these two subregions. In this case, provision is further made for it to be possible to connect the first subregion in a fixed manner to the withdrawable part rack, and for the second subregion to be held on the rear wall of the withdrawable part rack with play running transversely with respect to the movement direction of the switching device.

With such a configuration, the two subregions are not rigidly connected but are decoupled from one another mechanically via a flexible current strip. The first subregion provided for connecting the grounding device is attached to the withdrawable part rack when a grounding means is connected, such that the electrodynamic forces are absorbed by the withdrawable part rack. Due to the play which is provided in the second subregion of the contact support, the subregion bearing the second contact, the second contact, aligns itself automatically with the first contact in an optimum manner when the switching device is pushed into the withdrawable part rack.

The play is preferably provided by the second subregion of the contact support being in the form of a tab which is arranged moveably in retaining slots formed in the withdrawable part rack. In this case, a guide element may be formed on the second subregion, which engages in a guide formed in the rear wall of the withdrawable part rack. With such a configuration, it is possible, on the one hand, to limit the play in the second subregion to a predetermined preferred direction, in particular in a direction transverse to the contact surfaces of the contacts, and, on the other hand, to predetermine the magnitude of the play.

It is also advantageous if the second subregion of the contact support rests against the inside of the rear wall of the withdrawable part rack and the withdrawable part rack has a bushing for the contact strip. Thus, the external configuration of the withdrawable part rack remains unaltered, with the result that parts of a switchgear assembly which can be associated with the switching device, for example an isolating wall, can likewise remain unaltered.

In the case of the new grounding device, the first and the second contact (which may be in the form of a contact blade and of a opposing contact provided with contact fingers) are arranged in an expedient manner such that the contact surfaces of the two contacts run parallel to a side wall of the withdrawable part rack. This ensures that the contact strip used for connecting the two subregions is as short in length as possible.

BRIEF DESCRIPTION OF THE DRAWINGS

An exemplary embodiment of the new grounding device is shown in FIGS. 1 to 5, in which.

DETAILED DESCRIPTION OF THE PREFERRED EMBODIMENTS

In electrical switchgear assemblies, the withdrawable part racks (modular frames) provided for accommodating electrical switches have, for reasons of personnel protection, a connection for a grounding device (for example a conductor cable which is connected to a ground point). In order to comply with the majority of the existing safety requirements, it is sufficient if, when inserted into a withdrawable part rack which is to be grounded in this manner, the metallic regions of the outer wall of a switching device make contact with the withdrawable part rack, and are thus grounded via the grounding connection of the withdrawable part rack.

For this purpose, suitable known switching devices make contact with the withdrawable part rack, for example, via their guide rails or via contact force springs mounted on the side wall of the switching device and sliding on the side wall of the withdrawable part rack. Such devices are not sufficient, however, to satisfy stricter local safety requirements, which demand, for example, that currents of up to 60 kA can be dissipated safely away from the switching device. The exemplary embodiment, described below, of the new grounding device is an additional grounding device which may be supplied separately and may be retrofitted to a switchgear assembly if said assembly is subject to such stricter safety requirements.

Figure 1:
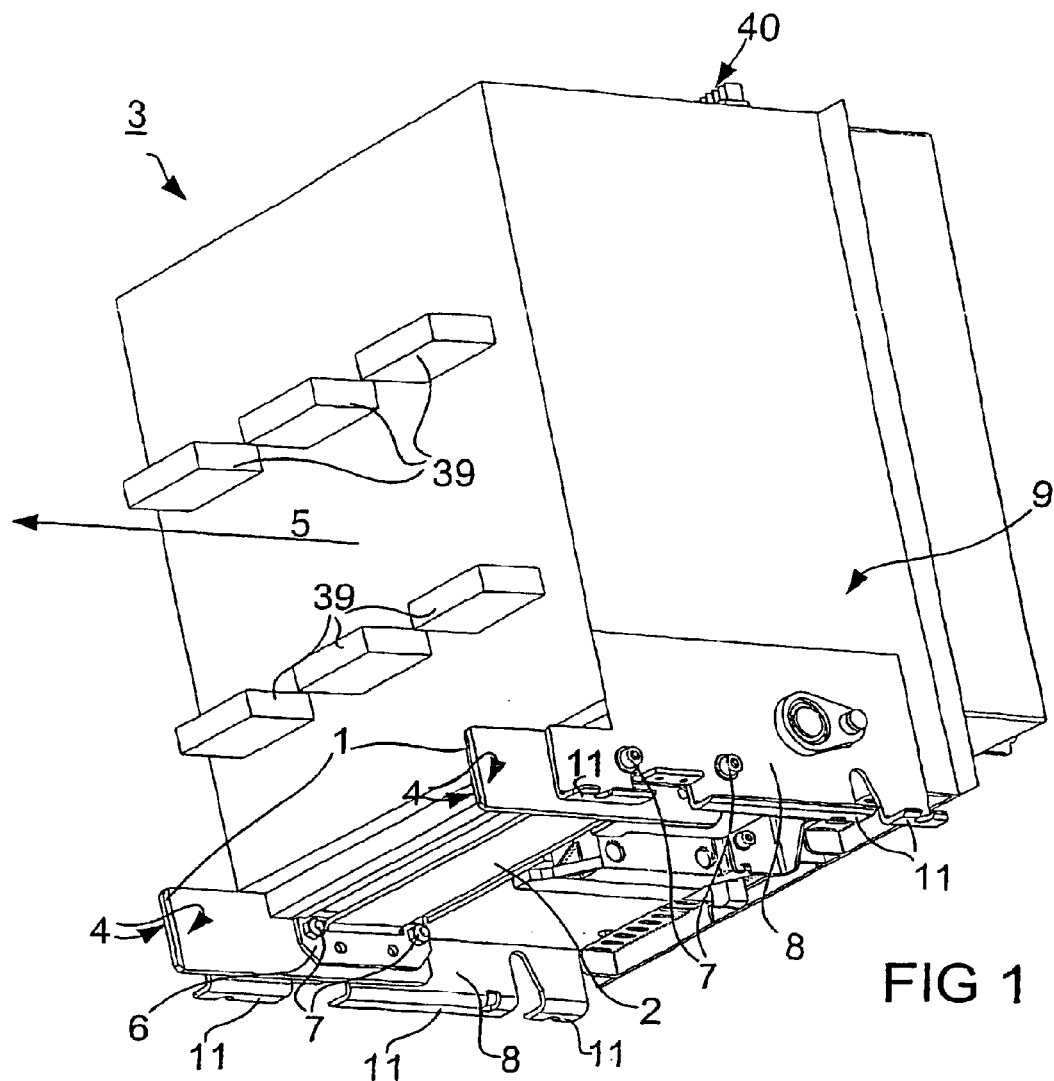
FIG. 1 shows a low-voltage power breaker which can be pushed into a withdrawable part rack or module frame.

As shown in FIG. 1, this grounding device which may be retrofitted has two first contacts 1 in the form of contact blades, which are connected to one another in a conductive manner via a support 2 and are arranged in the base area of the switching device 3 which is in the form of a low-voltage power breaker. The contact surfaces 4 of the contact blades extend (leading main contacts 39 and auxiliary contacts 40) in the direction of the withdrawable part rack, parallel to the side walls 9 of the switching device (movement direction 5 of the switching device). At both ends, the support 2 has angled surfaces 6 which run parallel to the contact blades 1. The contact blades are attached to conductive side plates 8 of the side walls 9 of the switching device 3 via conductive spacers, not illustrated in the drawing, by means of in each case two screw connections 7.

The feet 11, formed on the side plates 8, of the low-voltage power breaker are placed, for the purpose of installing said power breaker in a withdrawable part rack 10 (cf. FIG. 2), on guide rails 12 (cf. FIG. 2) which can be partially removed from the withdrawable part rack. The withdrawable part rack may be arranged in a chamber of a switch panel of a switchgear assembly. By way of a transport mechanism which is not described in further detail, it is then possible for the switching device to be moved along the guide rails 12 from a disconnected position to an operating position. The transport mechanism may in this case be similar to the transport mechanism disclosed in EP 0 228 987 B1.

Figure 2:
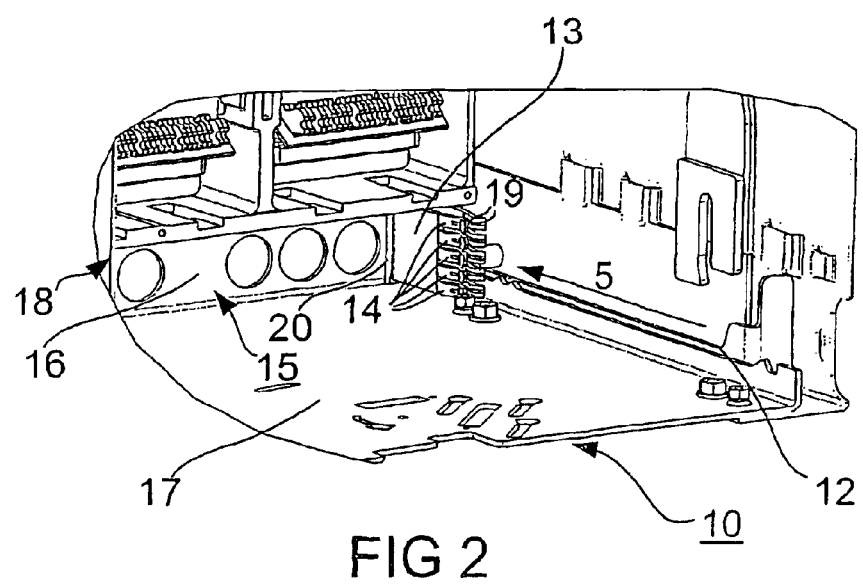
FIG. 2 shows a detail of an internal view of a withdrawable part rack for the low-voltage power breaker shown in FIG. 1.

As shown in FIG. 2, the additional device also has two second contacts 13 associated with the withdrawable part rack 10. These contacts 13 are in the form of opposing contacts provided with contact fingers 14 (cf. also FIG. 3). A first contact of these second contacts 13 is kept close to the left-hand side wall and the second is kept close to the right-hand side wall on the inside 15 of a section 16 of the base plate 17 which is bent upward and forms a subregion of the rear wall 18 of the withdrawable part rack. The contact surfaces 19, formed on the contact fingers 14, of these second contacts 13 (cf. also FIG. 3) likewise extend in the movement direction 5 of the switching device.

For this purpose, the second contacts 13 are in each case in the form of U-shaped contact brackets, a plurality of contact fingers 14 being integrally formed on the limbs of these contact brackets. When the switching device 3 is inserted into the withdrawable part rack, these contact fingers 14 rest in a sprung manner in the withdrawable part rack on both sides of the contact blade, from the disconnected position to the operating position of the switching device. The second contacts 13 are screwed tightly to a contact support 20.

Figure 3:
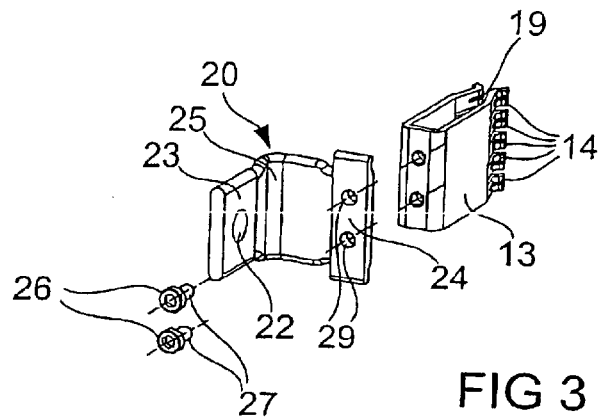
FIG. 3 shows an exploded illustration of elements, associated with the withdrawable part rack, of the new grounding device.

As shown in FIG. 3, each contact support 20 has a first subregion 23, which is associated with a grounding means 21 (cf. FIGS. 4 and 5) and, in addition to this, is provided with a first connecting hole 22, and has a second subregion 24. which is associated with the second contact 13, as well as a contact strip 25 connecting these two subregions 23, 24. This contact strip 25, which is in the form of a flexible copper strip, produces a current-conducting connection between the two subregions 23, 24, but decouples them mechanically. For the purpose of attaching the second contact 13 to the second subregion 24, which is in the form of a tab, of the contact support 20, two screws 27 are used which are provided with a cylindrical screw head 26 and have a hexagonal insert for enabling them to be turned. These screws 27 pass through the tab 24 in the region of two holes 29 and are screwed tightly to the second contact 13.

Figure 4:
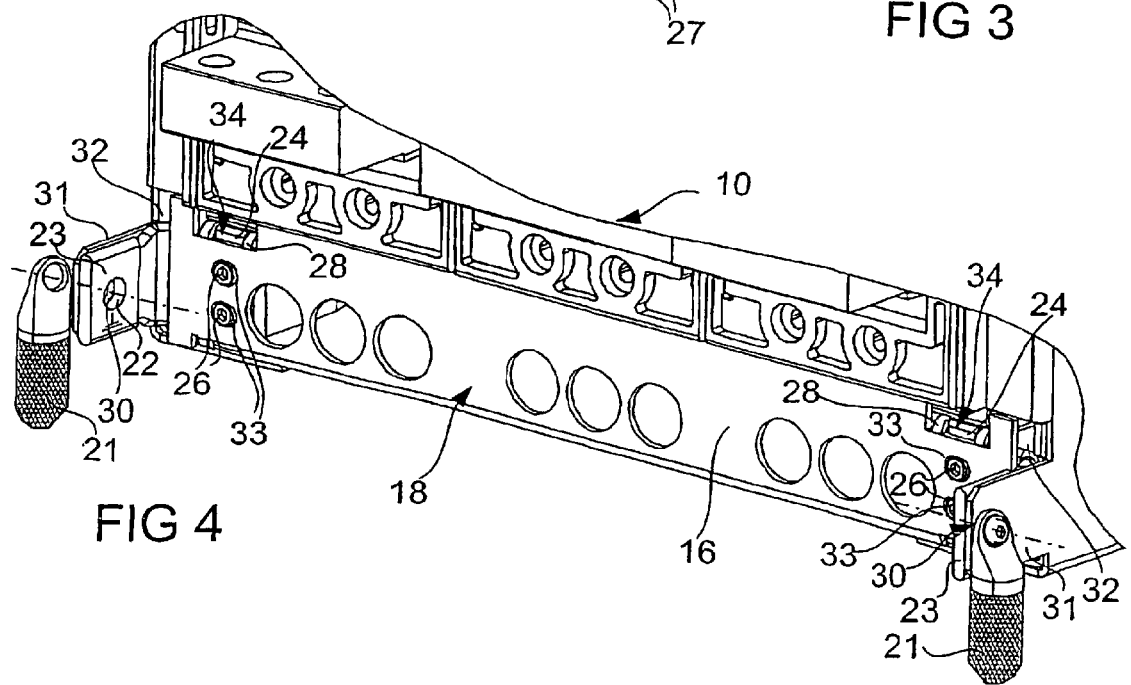
FIG. 4 shows a detail of an external view of the withdrawable part rack.

As shown in FIG. 4, the withdrawable part rack 10 has two ground connections which are each provided with a second connecting hole 30 and are in the form of sections 31 of the side walls which protrude beyond the rear wall 18 of the withdrawable part rack 10 like tabs. Two ducts 32 for the contact strips 25 are situated between the section 16 of the base plate which is bent upward and the sections 31 which protrude like tabs. The regions of the contact strips 25, which pass through the ducts 32, and the second subregions 24 of the contact supports in each case rest flat against one of the sections 31, which protrude like tabs, of the side walls, with the result that the first connecting holes 22 formed on the first subregions 23 run coaxially with respect to the second connecting holes 30 of the withdrawable part rack. This ensures that the first subregions 23 of the two contact supports are fixed on the withdrawable part rack 10 when the grounding means 21 is attached tightly.

In the region of the section 16 of the base plate which is bent upward, there are in each case two guides 33, in the form of elongated holes, for the screws which are provided with cylindrical heads 26 and used as guide elements for the contact supports. Two edge sections 28, each provided with a recess, of the section of the base plate which is bent upward and rearward, are bent in in the inner region of the withdrawable part rack. In each case one first edge region of the second subregion, in the form of a tab, of the respective contact support passes through the edge sections such that they form retaining slots 34 for the second subregions 24.

Figure 5:
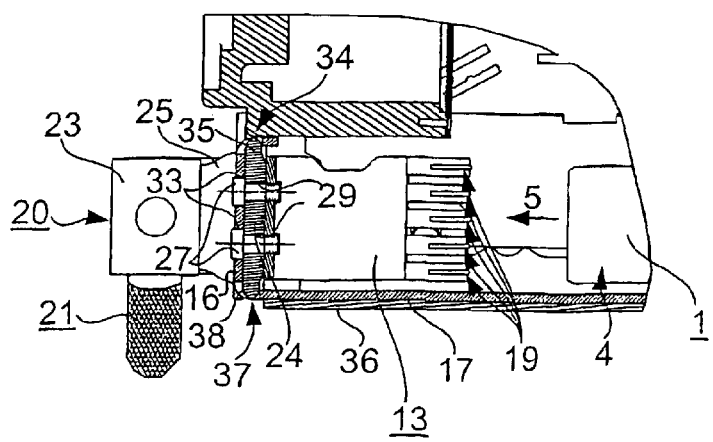
FIG. 5 shows a sectional illustration along line A—A of the elements, arranged in the withdrawable part rack, of the grounding device shown in FIG. 4.

In accordance with FIG. 5, further retaining slots 37 are in each case formed in the base plate 17 and in sections 36 of the side plates which run parallel to the base plate. A second edge region 38 of the tab 24 may, while the two contact supports are being fitted, initially pass through these further retaining slots 37 to such an extent that the respective tab rests flat against the section 16 of the base plate which is bent upward. The tab can then be moved until its first edge region 35 passes through the first retaining slot 34 and the holes 29 in the tab 24 are positioned coaxially with respect to the elongated holes 33. The screws 27 provided with the hexagonal insert are then inserted and tightened. The second subregion 24 of each contact support 20 is thus held on the rear wall of the withdrawable part rack by way of the cylindrical screw heads 26, which can be guided along the elongated holes 33, with play, running transversely with respect to the contact surfaces 4 of the first contact I and the contact surfaces 19 of the second contact 13.

When the switching device is pushed into the withdrawable part rack, the second contacts 13 are automatically aligned with the first contacts 1, depending on the position of the switching device, with the result that the contact fingers 14 of the respective second contact 13 rest on both sides of the associated contact blade 1 with the same contact force.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A device for grounding a switching device, arranged moveably between a disconnected position and an operating position in a withdrawable part rack, comprising:
    a first contact, arranged on the switching unit;
    a second contact associated with the withdrawable part rack; and
    a contact support associated with the second contact, wherein the first and second contacts extend in the movement direction of the switching devices such that they rest against one another in a sprung manner when the switching device is moved from the disconnected position to the operating position, the contact support including,
        a first subregion, provided for connecting a grounding device,
        a second subregion, connectable to the second contact, and
        a contact strip connecting the first and second subregion, wherein the first subregion is connectable in a fixed manner to the withdrawable part rack, and wherein
    the second subregion is held on the rear wall of the withdrawable part rack with play, running transversely with respect to the movement direction of the switching device.

2. The device as claimed in claim 1, wherein the first contact is in the form of a contact blade, and the second contact is in the form of an opposing contact provided with contact fingers,
    the contact surfaces of the two contacts running parallel to one side wall of the withdrawable part rack.

3. The device as claimed in claim 1, wherein
    the second subregion is in the form of a tab, arranged moveably in retaining slots formed in the withdrawable part rack.

4. The device as claimed in claim 3, wherein a guide element is formed on the second subregion and engages in a guide formed in the rear wall of the withdrawable part rack.

5. The device as claimed in claim 3, wherein the contact support and the second contact are connected in a fixed manner by way of the guide element.

6. The device as claimed in claim 3, wherein the second subregion of the contact support rests against the inside of the rear wall of the withdrawable part rack and wherein the withdrawable part rack includes a bushing for the contact strip.

7. The device as claimed in claim 3, wherein the first contact is in the form of a contact blade, and the second contact is in the form of an opposing contact provided with contact fingers, the contact surfaces of the two contacts running parallel to one side wall of the withdrawable part rack.

8. The device as claimed in claim 1, wherein a guide element is formed on the second subregion and engages in a guide formed in the rear wall of the withdrawable part rack.

9. The device as claimed in claim 8, wherein the contact support and the second contact are connected in a fixed manner by way of the guide element.

10. The device as claimed in claim 8, wherein the second subregion of the contact support rests against the inside of the rear wall of the withdrawable part rack and wherein the withdrawable part rack includes a bushing for the contact strip.

11. The device as claimed in claim 8, wherein the first contact is in the form of a contact blade, and the second contact is in the form of an opposing contact provided with contact fingers, the contact surfaces of the two contacts running parallel to one side wall of the withdrawable part rack.

12. The device as claimed in claim 1, wherein the contact support and the second contact are connected in a fixed manner by way of the guide element.

13. The device as claimed in claim 12, wherein the second subregion of the contact support rests against the inside of the rear wall of the withdrawable part rack and wherein the withdrawable part rack includes a bushing for the contact strip.

14. The device as claimed in claim 12, wherein the first contact is in the form of a contact blade, and the second contact is in the form of an opposing contact provided with contact fingers, the contact surfaces of the two contacts running parallel to one side wall of the withdrawable part rack.

15. The device as claimed in claim 1, wherein
    the second subregion of the contact support rests against the inside of the rear wall of the withdrawable part rack and wherein the withdrawable part rack includes a bushing for the contact strip.

16. The device as claimed in claim 15, wherein the first contact is in the form of a contact blade, and the second contact is in the form of an opposing contact provided with contact fingers, the contact surfaces of the two contacts running parallel to one side wall of the withdrawable part rack.

17. A device for grounding a switching device, arranged moveably between a disconnected position and an operating position in a modular frame, comprising:
    a first contact, arranged on the switching unit;
    a second contact associated with the modular frame; and
    a contact support associated with the second contact, wherein the first and second contacts extend in the movement direction of the switching device to rest against one another in a sprung manner when the switching device is moved from the disconnected position to the operating position, the contact support including,
        a first subregion, provided for connecting a grounding device,
        a second subregion, connectable to the second contact, and
        a contact strip connecting the first and second subregion, wherein the first subregion is connectable in a fixed manner to the modular frame, and wherein the second subregion is held on the rear wall of the modular frame with play, running transversely with respect to the movement direction of the switching device.

18. The device as claimed in claim 17, wherein the second subregion is in the form of a tab, arranged moveably in retaining slots formed in the module frame.

19. The device as claimed in claim 17, wherein a guide element is formed on the second subregion and engages in a guide formed in the rear wall of the module frame.

20. The device as claimed in claim 17, wherein the contact support and the second contact are connected in a fixed manner by way of the guide element.

21. The device as claimed in claim 17, wherein the second subregion of the contact support rests against the inside of the rear wall of the module frame and wherein the module frame includes a bushing for the contact strip.

22. The device as claimed in claim 17, wherein the first contact is in the form of a contact blade, and the second contact is in the form of an opposing contact provided with contact fingers, the contact surfaces of the two contacts running parallel to one side wall of the module frame.

* * * * *